United States Patent [19]

Maher

[11] 3,973,316

[45] Aug. 10, 1976

[54] METHOD OF MAKING PLANT CONTAINER

[76] Inventor: William Joseph Maher, 472 Ludlow Ave., Cranford, N.J. 07016

[22] Filed: Mar. 17, 1975

[21] Appl. No.: 559,173

[52] U.S. Cl. .............................. 29/416; 29/DIG. 9; 47/37; 93/39.1 R; 93/55.1 R

[51] Int. Cl.² .......................................... B23P 17/00

[58] Field of Search ......................... 29/416, DIG. 9; 93/55.1 R, 39.1 R; 47/34, 37

[56] References Cited

UNITED STATES PATENTS

| | | | |
|---|---|---|---|
| 1,380,812 | 6/1921 | Lathrop | 29/DIG. 9 |
| 1,756,243 | 4/1930 | Benson | 93/55.1 R X |
| 1,801,930 | 4/1931 | Lietz | 47/37 |
| 2,415,625 | 2/1947 | Coker | 93/39.1 R |
| 2,893,167 | 7/1959 | Davidson | 47/37 |
| 3,028,798 | 4/1962 | Allen | 93/55.1 R |
| 3,409,710 | 11/1968 | Klygis | 29/416 X |

*Primary Examiner*—Victor A. DiPalma
*Attorney, Agent, or Firm*—Dennis H. Irlbeck

[57] ABSTRACT

A plant container is formed from a plastic foam cup having a funnel-shaped sidewall and a disk-shaped bottom closing the small end of the sidewall by severing a first portion of the cup, including the bottom and a part of the sidewall, from a second portion of the cup, including the remaining part of the sidewall, along a plane perpendicular to a central axis passing through the cup and inserting and wedging the first portion into the second portion.

3 Claims, 4 Drawing Figures

METHOD OF MAKING PLANT CONTAINER

This invention relates to plant containers and particularly to containers in which plants are raised prior to transplanting.

In raising or growing plants, it is typical to raise them in small pots or containers until they reach sufficient size for transplanting. It is important during the transplanting procedure that the root structure of the plant and the soil surrounding the roots remain undisturbed. Replanting from prior art plant containers often results in disturbance of the root-soil structure. Such disturbance may result from tipping the container, grasping the plant or digging to remove the plant from the container. Therefore, a container is needed wherein a plant can be removed without damaging its rootsoil structure.

SUMMARY OF THE INVENTION

A plant container is formed from a plastic foam cup having a funnel-shaped sidewall and a disk-shaped bottom closing the small end of the sidewall by severing a first portion of the cup, including the bottom and a part of the sidewall, from a second portion of the cup, including the remaining part of the sidewall, along a plane perpendicular to a central axis passing through the cup and inserting and wedging the first portion into the second portion.

DETAILED DESCRIPTION

Figure 1:
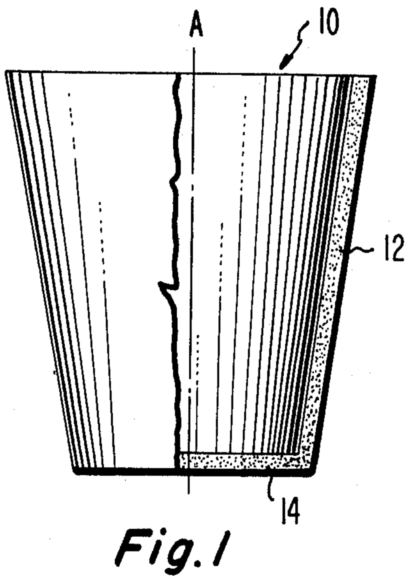
FIG. 1 is an elevational view, half in section, of a plastic foam cup.

FIG. 1 shows a typical drinking cup 10 of plastic foam construction. The cup 10 has a funnel-shaped sidewall 12 which is closed at its narrowest end by a disk-shaped bottom 14. It is possible to use such a cup for a plant container by forming a drainage hole in its bottom 14, however, after a plant has been allowed to grow in the cup, it would be very difficult if not impossible to remove the plant without loosening the soil in the cup and possibly damaging the root structure of the plant.

Figure 2:
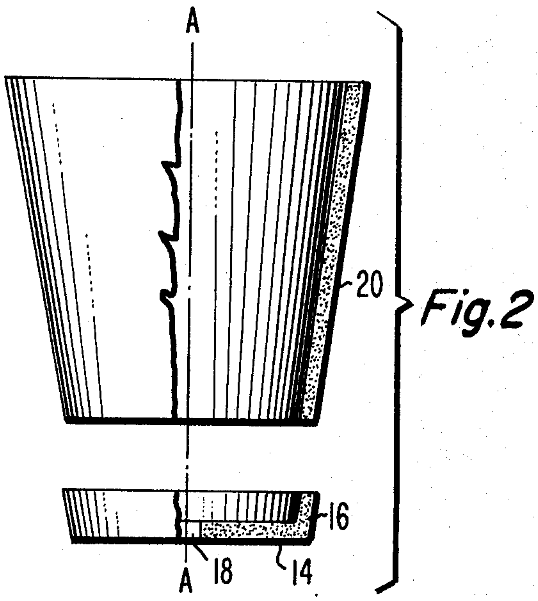
FIG. 2 is an elevational view, half in section, of the cup of FIG. 1 severed into two portions.

The first steps taken to modify the cup 10 to obtain an improved plant container is illustrated in FIG. 2. In this figure, a lower portion 16 of the cup 10, including the cup bottom 14 and a small part of the cup sidewall 12, is severed along a plane perpendicular to the central axis A—A of the cup 10 from the remaining upper cup portion 20 which includes the rest of the cup sidewall 12. A small drainage hole 18 is formed in the bottom 14 either before or after the lower portion 16 is severed from the upper portion 20.

Figure 3:
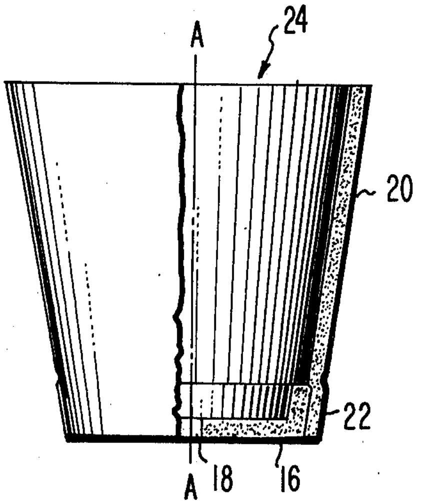
FIG. 3 is an elevational view, half in section, of a plant container constructed in accordance with the present invention.

Thereafter, the severed lower portion 16 is inserted into the large end of the upper portion 20 until the lower portion 16 wedges against the interior of the narrowest part 22 of the upper portion 20. This forms the novel plant container 24, shown in FIG. 3. Because of the elasticity of the plastic foam, the narrowest part 22 of the upper portion 20 deflects slightly to accomodate the lower portion 16.

It should be noted that the fit between the two cup portions if very tight for most commercially manufactured plastic foam cups. Because of this tight fit, growth of the plant roots between the two portions is prevented. Removal of a plant from the formed container 24 is accomplished by grasping the container in an upright position and pushing up on the bottom 14 until the lower portion 16 loosens. An advantage obtained by use of the novel container 24 is that plants can be freed from the container 24 without inverting the container. Therefore, loose top soil and fertilizer need not be lost during the transplanting procedure.

Figure 4:
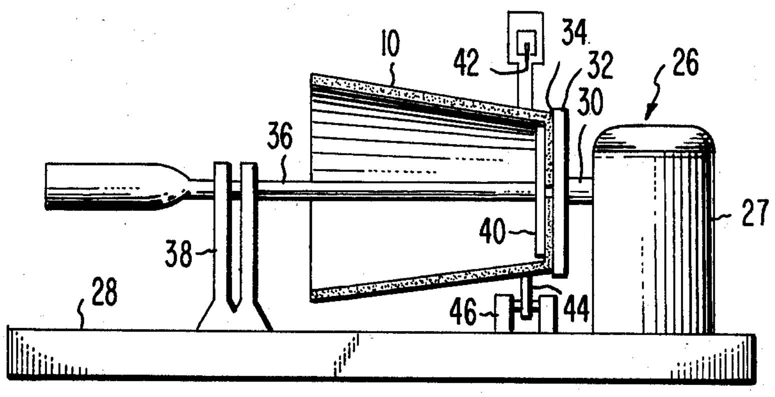
FIG. 4 is an elevational view of a device for severing a plastic foam cup into two portions, a cup shown thereon in section.

FIG. 4 presents a device 26 which may be used for severing the two portions of a plastic foam cup 10. The device 26 comprises a motor 27 mounted on a base 28. Extending from the motor 26 is a shaft 30 having a disk 32 attached thereto. The disk 32 has a central aperture (not shown) therein and is covered on its side opposite the motor 27 with a rough material 34, such a sandpaper. The cup 10 is held on a shaft 36, the end of which may be used to perforate a drainage hole in the bottom of the cup. The shaft 36 is held near one end by a dual bracket 38 extending from the base 28 and is inserted in the central aperature of disk 32 at the other end. Shaft 36 includes a disk 40 attached near an end thereof which is used to hold the cup 10 in contact with the rough material 34 on the disk 32. The surface of the disk 40 contacting the cup 10 also preferably is covered with a rough material. A razor blade 42 is attached to an arm 44 that is pivotly suspended from brackets 46 attached to the base 28. The blade 42 is positioned to cut the cup 10 at a desired plane through the cup when arm 44 is pivoted toward the cup while it is rotating. Thereafter, the shaft 36 is removed from the device 26 and the upper portion 20 is allowed to slip off. The shaft 36 with the lower portion 16 still thereon can be used as an anvil while forcing the upper portion 20 onto the lower portion 16 thus forming container 24.

I claim:

1. A method of forming a plant container from a plastic foam cup having a funnel-shaped sidewall and a disk-shaped bottom closing a small end of said sidewall comprising, severing a first portion of said cup, including said bottom and a part of said sidewall, from a second portion of said cup, including the remaining part of said sidewall, along a plane perpendicular to a central axis passing through said cup, and, inserting and wedging said first portion into said second portion.

2. The method as defined in claim 1 including perforating said disk-shaped bottom.

3. The method as defined in claim 1 wherein said severing is accomplished by rotating said cup about its central axis and placing a cutting blade into contact with said sidewall.

* * * * *